United States Patent [19]

Partridge

[11] Patent Number: 4,509,349
[45] Date of Patent: Apr. 9, 1985

[54] BICYCLE WITH KEY-OPERATED LOCKING MECHANISM

[76] Inventor: Wilfred H. Partridge, 1477 Royal Blvd., Glendale, Calif. 91207

[21] Appl. No.: 448,025

[22] Filed: Feb. 15, 1983

[51] Int. Cl.³ .............................................. E05B 71/00
[52] U.S. Cl. ........................................ 70/233; 70/185
[58] Field of Search ................. 70/233, 185, 182, 183, 70/184

[56] References Cited

U.S. PATENT DOCUMENTS

| 1,459,584 | 6/1923 | Ericsson | 70/233 |
| 2,204,908 | 6/1940 | Olson | 70/233 |
| 2,544,590 | 3/1951 | Dyson | 70/233 |

FOREIGN PATENT DOCUMENTS

| 576711 | 5/1958 | Italy | 70/184 |
| 26177 | of 1897 | United Kingdom | 70/233 |
| 19054 | of 1898 | United Kingdom | 70/185 |

Primary Examiner—Robert L. Wolfe
Attorney, Agent, or Firm—Fulwider, Patton, Rieber, Lee & Utecht

[57] ABSTRACT

A bicycle with a key-operated locking mechanism for securing the steering connection between the handlebar and the front wheel fork to the frame to disable the bicycle. A lock cylinder in a protective housing is mounted on the rear side of the head tube of the frame, in the "V" of the frame struts, and has a lock body with an arcuate recess in which the fork stem is nested, and has a radial bolt that swings in an annular groove in the lock body, between a retracted, unlocking position and a forwardly extended, locking position in which the bolt projects into the recess and into one of two angularly spaced longitudinal locking slots in the telescoped fork and handlebar stems, thereby to prevent steering.

5 Claims, 5 Drawing Figures

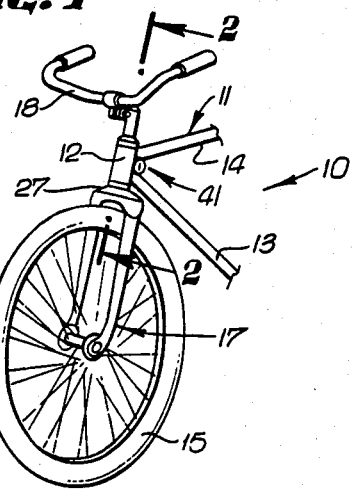
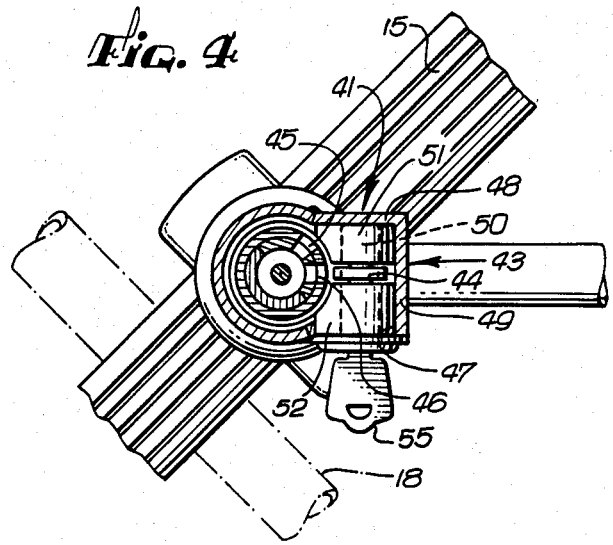
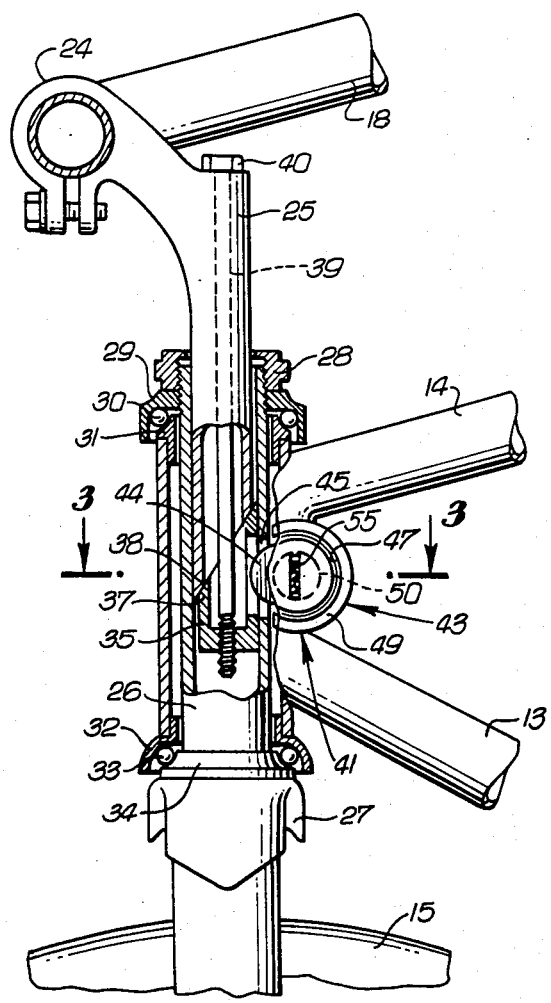
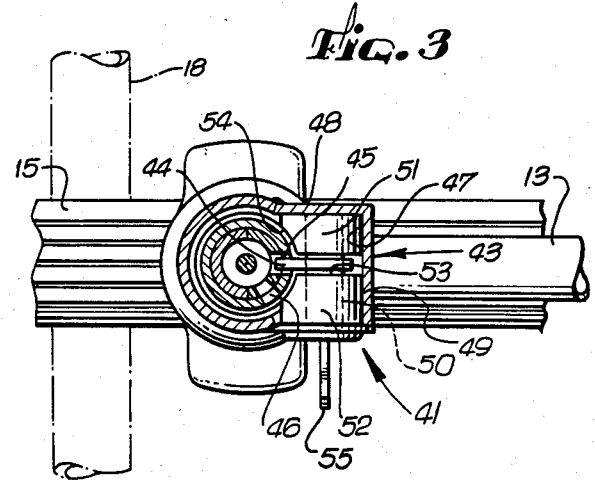
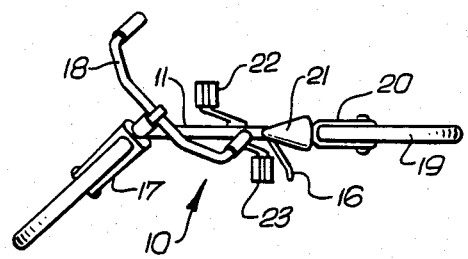

BICYCLE WITH KEY-OPERATED LOCKING MECHANISM

BACKGROUND OF THE INVENTION

This invention relates generally to bicycles, and relates more particularly to locking mechanisms for preventing the theft of bicycles.

Numerous different types of locking mechanisms and devices have been proposed and used through the years to combat bicycle thefts, ranging from a simple chain-and-padlock device to a variety of different mechanisms for attachment to or incorporation in a bicycle. One general approach is to prevent turning of one of the wheels (for examples, see U.S. Pat. Nos. 4,180,998 and 563,991), and another is to prevent steering of the front wheel (for examples, see U.S. Pat. Nos. 2,625,813, 608,080 and 605,981).

In a typical bicycle, the front wheel is mounted in a fork that is supported on the front end of the frame by an upright "head tube", and is steered by means of a handlebar that is disposed above the head tube and connected to the fork through the head tube. Usually, the fork and the handlebar are connected by telescoping stems forming a steering connection that is rotatably mounted in bearings in the head tube. The head tube is supported on at least one frame strut, usually a so-called "down tube" that is inclined downwardly and rearwardly above the front wheel, and frequently by an upper generally horizontal strut as well, a so-called "top tube" that makes a "V" with the down tube.

When a padlock and chain are used to lock the bicycle, the chain typically is passed through a wheel and around part of the frame, and sometimes around a fixed object as well so that the bicycle cannot be carried away. Since much of the problem of bicycle theft is attributable to thieves who ride away on the stolen bicycle, simply locking a wheel to the frame is sufficient to discourage most thieves, except those who carry tools to cut chains or padlocks.

In prior locking mechanisms that were designed to lock the front wheel assembly against steering, means have been provided for locking the fork to the frame, sometimes using a key lock for the ease and convenience obtained with such a lock. These have not found commercial acceptance, however, perhaps because of their relatively complicated construction or for other reasons related to cost and effectiveness.

SUMMARY OF THE INVENTION

The present invention resides in a simple and effective key-locking mechanism that is readily incorporated in a conventional bicycle, comprising a locking cylinder that is mounted on one side of the head tube, a radially projecting locking bolt that is wingable by the cylinder into and out of a locking position inside the head tube for locking engagement with the rotatable steering connection therein, in at least one longitudinal locking slot in the outer side of the steering connection that is aligned with the locking bolt in a preselected angular position of the steering connection and, therefore, of the front wheel. The locking slot and the bolt are sized to be engaged with a close fit, so that the opposite sides of the slot constitute opposed abutments for cooperating with the bolt to prevent steering of the bicycle when the locking mechanism is locked.

More specifically, the locking mechanism of the present invention encloses the locking cylinder in a relatively heavy protective housing that is fitted over an opening in the head tube, preferably in the rear side thereof where the case is protected by the frame strut or struts, and a finger-like bolt projecting radially from the cylinder and swingable between a forwardly projecting, locking position and a retracted position. Two angularly spaced slots are formed in the steering connection, one to receive the bolt when the wheel is in a straight-ahead position, and one to receive the bolt when the wheel is in a turned position suitable for kickstand parking. The slots also have closed ends forming abutments that are engageable with the bolt to prevent removal of the handlebar when the bicycle is locked.

Other advantages and features of the invention will be apparent from the following detailed description, taken in conjunction with the accompanying drawings.

BRIEF DESCRIPTION OF THE DRAWINGS

FIG. 1 is a fragmentary perspective view of a front portion of a bicycle having a locking mechanism embodying the novel features of the present invention;

FIG. 2 is an enlarged fragmentary cross-sectional view taken generally along line 2—2 of FIG. 1, with portions broken away to show details, the locking mechanism being shown locked;

FIG. 3 is a fragmentary cross-sectional view taken generally along line 3—3 of FIG. 2 with the handlebar partially shown in phantom lines;

FIG. 4 is a view similar to FIG. 3 with the front wheel and the handlebar turned to one side and the locking mechanism shown unlocked; and FIG. 5 is a top plan view of the full bicycle with its front wheel locked in the turned position with a kickstand shown in an extended position.

DETAILED DESCRIPTION OF THE PREFERRED EMBODIMENT

As shown in drawings for purposes of illustration, the invention is embodied in a conventional bicycle, designated generally by the reference number 10, having a frame 11 including a head tube 12 mounted on the forward ends of a downwardly inclined "down tube" 13 and a generally horizontal "top tube" 14. A front wheel 15 is rotatably supported in a fork 17, and a handlebar 18 is connected to the fork through the head tube, to steer the bicycle by turning the front wheel assembly, including the fork 17 and the wheel 15, as the handlebar is turned.

Also shown in FIG. 5, the illustrative bicycle 10 also has a rear wheel 19 that is mounted on a rear fork 20 forming the rear end of the frame, a seat 21 for the rider (not shown), and a pair of pedals 22 and 23. A kickstand 16 is provided for parking the bicycle in the standing position shown in FIG. 5.

To connect the handlebar 18 to the front wheel fork 17, the handlebar is clamped in a fitting 24 on the upper end of a stem 25, which extends downwardly into the head tube and telescopes with an upwardly projecting stem 26 on the fork. In this instance, the handlebar stem 25 extends downwardly with a close fit into the open upper end of a larger sleeve that forms the fork stem 26, which is mounted on the upper end 27, or "crown", of the fork and extends upwardly through the head tube 12. In this manner, the handlebar assembly is steerably connected to the fork assembly.

A top lug nut 28 is threaded onto the upper end of the fork stem 26, above a ring-shaped head clip 29 which confines a series of ball bearings 30 against a race ring 31 that is fitted into the upper end of the head tube and provides rotational support in the head tube for the upper end portion of the steering connection. At the lower end of the head tube, a flanged bearing cage 32 overlies a second series of ball bearings 33, which ride around a race ring 34 on the fork crown 27, completing the rotational support of the steering connection.

To hold the handlebar stem 25 in the fork stem 26, the lower end portion 35 of the stem 25 is formed separately, with an inclined upper end 37 that wedges against an oppositely inclined lower end 38 of the upper portion of the stem, and is pulled upwardly by a binder bolt 39 having a head 40 at the upper end of the handlebar stem. As the lower end portion 35 is pulled upwardly, it is wedged against the interior of the fork stem and bound tightly therein, the upper end portion of the stem being wedged in the opposite direction.

With this basically conventional arrangement, the front wheel 15, and its supporting parts constituting the front wheel assembly, are steerably mounted on the frame 11 and connected to the handlebar 18 and its related parts, constituting the handlebar assembly, to be steered thereby. In accordance with the present invention, a novel locking mechanism 41 is incorporated in this conventional bicycle structure in a relatively simple, inexpensive and unobtrusive manner and is effective to lock the front wheel quickly and easily against steering movement, thereby effectively disabling the bicycle so that a would-be thief will be unable to ride the bicycle away from the location where it is left. Preferably, the locking mechanism is designed for selective locking of the wheel either in a straight-ahead position or in a turned position.

For these purposes, the locking mechanism 41 comprises a cylinder lock that is substantially enclosed in a durable protective housing 43 and mounted transversely on the head tube 12, herein on its rear side in the "V" formed by the two frame tubes 13 and 14, with a radial locking bolt 44 positioned to project forwardly in a locking position (FIGS. 2 and 3) into one of two angularly spaced, longitudinally extending locking slots 45, 46 in the outside of the steering connection, thereby providing the two different locked positions of the wheel. Each of these slots is sufficiently wider than the thickness of the locking bolt to receive the bolt readily as it is turned to the locking position, after which the opposite side walls of the slot serve as locking abutments cooperating with the bolt to substantially immobilize the stems 25 and 26, and thus the front wheel 15. In this instance, both slots extend through the outer fork stem 26 and into the inner handlebar stem 25, and the bolt is long enough to reach into the handlebar stem as well.

As shown most clearly in FIGS. 3 and 4, the protective lock housing 43 is part-cylindrical in shape, having an open end 47 in which one end of the cylinder lock is exposed, a closed opposite end 48, and a curved sidewall 49 that encases the cylinder and holds it against the head tube 12, actually partially within the head tube in an opening in the rear side thereof, and herein joined to the frame struts 13 and 14 at the vertex of the "V" they form, for reinforcement and an unobtrusive position. The housing 43 may be made of steel or other high-strength material, and either welded in place or made as an integral part of the frame 11.

The cylinder lock includes a conventional lock cylinder 50 that is mounted within two generally cylindrical heads 51 and 52 forming a lock body that has a central annular groove 53 through which the bolt 44 projects, and an arcuate, crescent-shaped recess 54 in one side for fitting into the head tube 12 and around the side of the steering connection, so that the latter is partially "nested" in the lock body. The lock cylinder extends coaxially through these heads and is rotatable therein by a key 55 (FIGS. 3 and 4). Various types of conventional lock cylinders may be used, so the details of the cylinder 50 are not shown herein.

As shown in FIGS. 2, 3 and 4, the bolt 44 is a fingerlike plate or bar that preferably is composed of steel or another high-strength metal and is relatively wide, vertically (see FIG. 2) for substantial strength and bearing area, while being relatively narrow, horizontally (see FIGS. 3 and 4). It is secured at one end to the lock cylinder 50 within the groove 53, and projects radially therefrom to move along the groove as the cylinder turns within the lock body.

Herein, the cylinder 50 turns about ninety degrees during movement between the locking position (FIGS. 2 and 3) and the unlocking position (FIG. 4), swinging the bolt 44 between an upwardly extending unlocking position, in which it is retracted from the locking slots 45 and 46 and spaced rearwardly from the fork stem 26, and a forwardly extending locking position, in which it projects into the recess 54 in the lock body to enter one of the locking slots when one of them is aligned with the bolt, as shown in FIGS. 2 and 3.

With the locking mechanism 41 of the present invention, disabling the bicycle 10 to discourage theft is a simple matter—the handlebar 18 simply is turned to the desired position, either straight ahead or an angle as shown in FIGS. 4 and 5, preferably about forty-five degrees. Then the key 55 is turned from the unlocking position in FIG. 4 to the locking position in FIG. 3, with perhaps a small amount of turning of the wheel by feel to align the bolt with the selected slot 45 or 46. Then the key is withdrawn and the bicycle is locked, in a disabled condition that discourages theft. The user, of course, carries the key, and merely inserts and turns it to unlock the bicycle. The key may be left in place in the cylinder 50 when the bicycle is unlocked, in view of the out-of-the-way location of the locking mechanism.

From the foregoing, it will be evident that the locking mechanism 41 of this invention provides a simple and effective lock that is readily incorporated in a conventional bicycle. It also will be evident that, while one particular embodiment of the invention has been illustrated and described in detail, various modifications and changes may be made within the spirit and scope of the invention.

I claim as my invention:

1. In combination with a bicycle having a frame including an upright head tube having an opening in its rear side and two struts arranged in a "V" with the head tube at the vertex, a handlebar having a depending stem projecting downwardly into the head tube, a front wheel fork having an upstanding fork stem projecting upwardly into the head tube and telescoping with the handlebar stem, and means for rotatably mounting the telescoped stems in the head tube for steering of the bicycle, an improved locking mechanism fitted into the "V" between the struts and against the head tube, comprising:

a cylinder lock extending transversely across said rear side and having a lock cylinder with a key slot at one end, a body rotatably supporting said lock cylinder and having an annular groove around the body, a removable key for turning said cylinder in said body between locking and unlocking positions, and a locking bolt mounted on said lock cylinder and extending radially therefrom into said groove to swing along the groove as the lock cylinder is turned by said key;

said body having an arcuate recess in its front side in which said stems are nested, and said bolt projecting forwardly into said recess and into said head tube when said cylinder is in said locking position, and being retracted from said recess when the cylinder is in the unlocking position;

means defining first and second angularly spaced, longitudinally extending locking slots in at least the outer one of said telescoping stems alongside said cylinder lock, to be aligned with said bolt in two selected angular positions of said handlebar and said front wheel fork, said locking slots being sized to receive said bolt with a relatively close locking fit and to prevent steering of the bicycle;

and a part-cylindrical protective lock housing fitted over said lock cylinder and having an opening exposing said one end, said lock housing being secured to said frame to hold and protect said cylinder lock.

2. In combination with a bicycle having a frame including a head tube, a handlebar assembly, a front wheel fork assembly, a steering connection between said assemblies in said head tube, and means rotatably supporting said assemblies on said head tube for steering of the bicycle, an improved locking mechanism, comprising:

a cylinder lock mounted on said head tube alongside said steering connection and having a lock cylinder, two spaced, generally cylindrical heads forming a lock body with an annular groove between its ends, said body rotatably supporting said lock cylinder for rotation between locking and unlocking positions and having a recess on one side in which part of said steering connection is fitted, a key for turning said lock cylinder between said locking and unlocking positions, a radial locking bolt on said cylinder, said bolt being disposed in said groove to be projected toward said steering connection in said locking position and retracted therefrom in the unlocking position;

means forming opposed locking abutments on said steering connection for receiving the projecting locking bolt when said cylinder is in said locking position, thereby to prevent steering of the bicycle;

and a protective housing mounting said cylinder lock on said frame.

3. The combination of a bicycle and a locking mechanism as defined in claim 2 wherein said frame has two struts arranged in a "V" with said head tube at the vertex of the "V", and said protective housing is secured to said head tube and said struts in the "V".

4. In combination with a bicycle having a frame including a head tube and two struts arranged in a "V" with said head tube at the vertex of the "V", a handlebar assembly, a front wheel fork assembly, a steering connection between said assemblies in said head tube, and means rotatably supporting said assemblies on said head tube for steering of the bicycle, an improved locking mechanism, comprising:

a cylinder lock mounted on said head tube alongside said steering connection and having a lock cylinder, means rotatably supporting said lock cylinder for rotation between locking and unlocking positions, a key for turning said lock cylinder between said positions, a radial locking bolt on said cylinder projecting toward said steering connection in said locking position and retracted therefrom in the unlocking position;

means forming opposed locking abutments on said steering connection for receiving the projecting locking bolt when said cylinder is in said locking position, thereby to prevent steering of the bicycle; and a protective housing mounting said cylinder lock on said frame in the "V" between the struts and against said head tube.

5. The combination of a bicycle and a locking mechanism as defined in claim 4 wherein said means rotatably supporting said lock cylinder includes two spaced, generally cylindrical heads forming a lock body with an annular groove between its ends, said body having a recess on one side in which part of said steering connection is fitted, and said bolt being disposed in said groove to swing therein as the cylinder turns.

* * * * *